United States Patent [19]

Fujita et al.

[11] Patent Number: 4,499,352
[45] Date of Patent: Feb. 12, 1985

[54] ADAPTER FOR MOUNTING SWITCH ONTO PANEL

[75] Inventors: Teizo Fujita, Ibaraki; Haruo Kimura, Takatsuki, both of Japan

[73] Assignee: Izumi Denki Corporation, Osaka, Japan

[21] Appl. No.: 436,888

[22] Filed: Oct. 26, 1982

[30] Foreign Application Priority Data

Dec. 2, 1981 [JP] Japan .......................... 56-179970[U]
Dec. 2, 1981 [JP] Japan .......................... 56-179971[U]
Dec. 2, 1981 [JP] Japan .......................... 56-179972[U]
Apr. 30, 1982 [JP] Japan ............................. 57-64665[U]

[51] Int. Cl.³ ............................................. H01H 13/04
[52] U.S. Cl. ..................................... 200/296; 200/330
[58] Field of Search ............... 200/296, 295, 307, 330, 200/331, 293; 248/27.1, 27.3; 338/197; 285/161

[56] References Cited

U.S. PATENT DOCUMENTS

| | | | |
|---|---|---|---|
| 1,106,488 | 8/1914 | Callaghan | 217/99 |
| 2,523,125 | 9/1950 | Ley | 200/340 |
| 4,154,125 | 5/1979 | Frank | 248/27.1 |
| 4,179,038 | 12/1979 | Rosan, Jr. | 285/161 |
| 4,186,762 | 2/1980 | Hardin | 200/296 |

FOREIGN PATENT DOCUMENTS

| | | | |
|---|---|---|---|
| 294853 | 11/1967 | Australia | 200/296 |
| 1135111 | 4/1957 | France | 200/293 |
| 307173 | 3/1929 | United Kingdom | 200/293 |
| 741926 | 12/1955 | United Kingdom | 200/296 |

Primary Examiner—John W. Shepperd
Assistant Examiner—Renee S. Kidorf
Attorney, Agent, or Firm—Pollock, Vande Sande & Priddy

[57] ABSTRACT

Disclosed is an adapter for enabling an actuating switch, which has at least one contact section and an actuating section movably accommodating therein an actuator for actuating the contact section and which is so arranged that a first hollow cylindrical portion constituting a part of the actuating section and axially movably accommodating therein the actuator, can be directly mounted in a first hole having a first predetermined inner diameter and previously formed in a panel, to be mounted through the adapter in a second hole having a second predetermined inner diameter and previously formed in the same or another panel. The adapter comprises a first engaging device for engaging with the actuating section and a second engaging device for engaging with the panel through the second hole.

2 Claims, 13 Drawing Figures

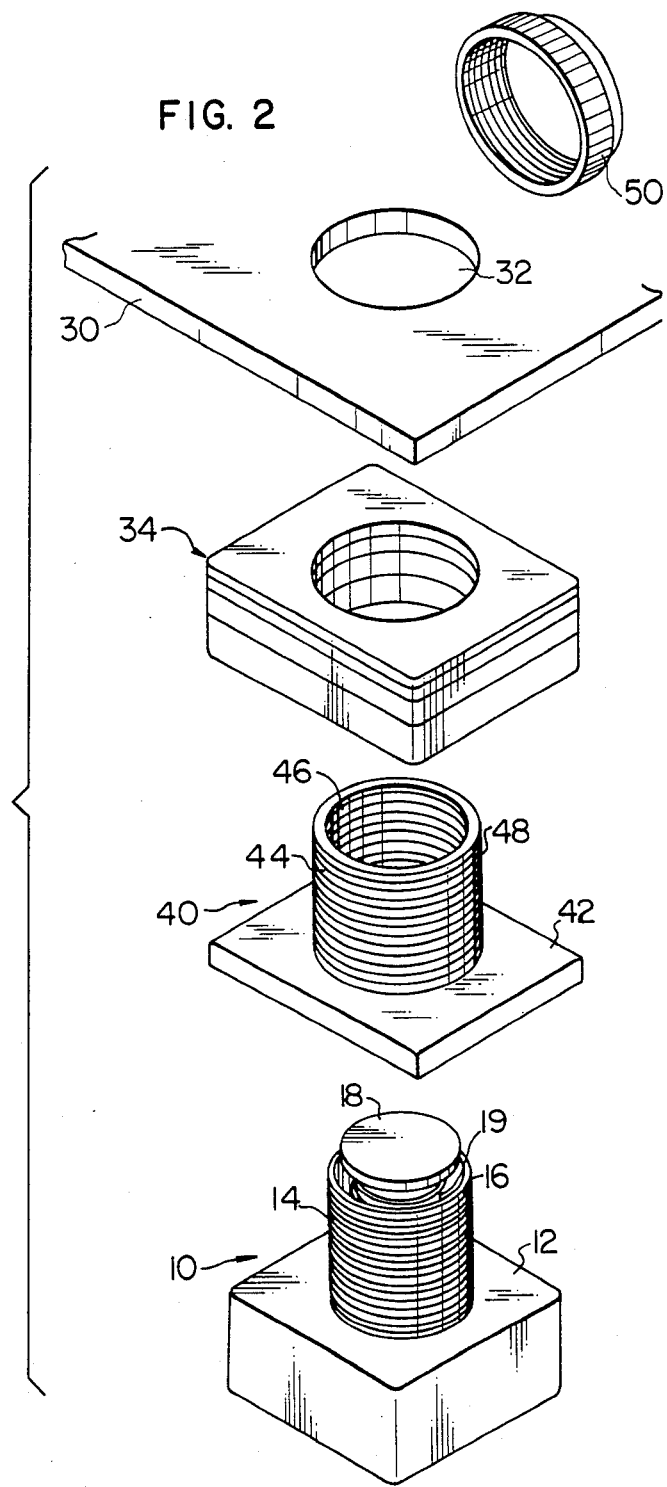

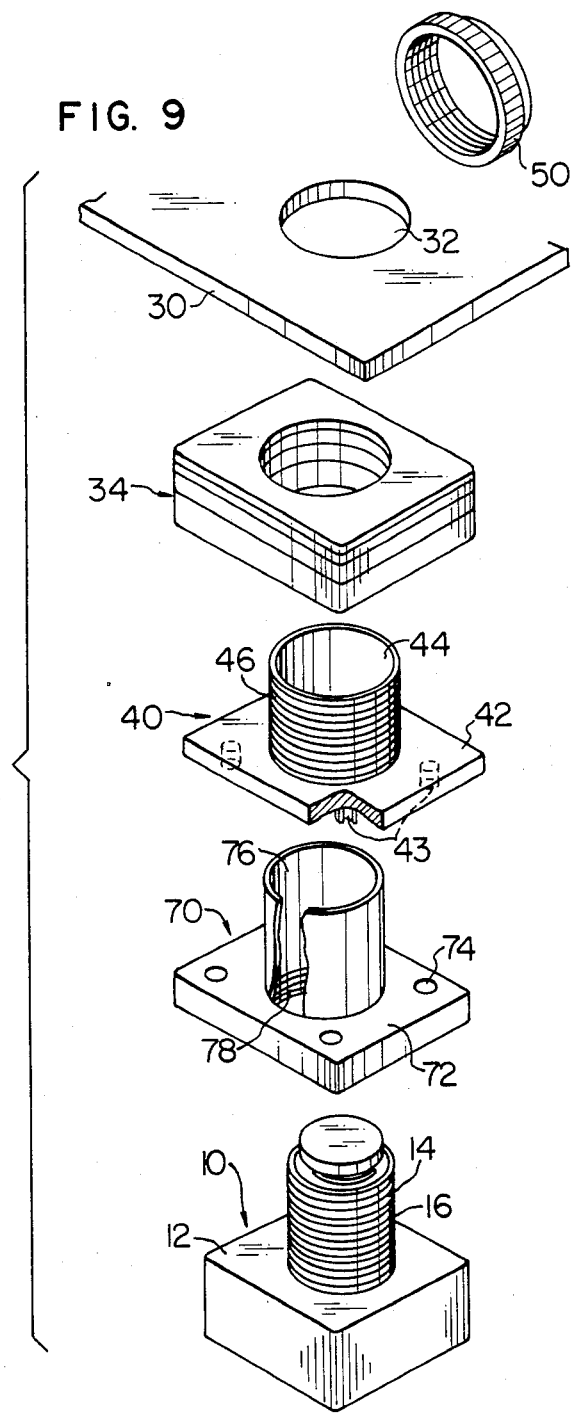

ADAPTER FOR MOUNTING SWITCH ONTO PANEL

TECHNICAL FIELD

The present invention relates to an adapter for mounting a switch onto a panel, and, particularly to an adapter for use when an actuating switch such as a push-button switch is to be mounted onto a panel in such a manner that a cylindrical portion of the switch penetrates a panel through a hole previously formed in the panel and is fixed to the panel by appropriate means such as a screw; and when the outer diameter of the cylindrical portion is smaller than would be best suited for the hole.

BACKGROUND ART

With respect to such an actuating switch as mentioned above, in many countries the outer diameter of the cylindrical portion of the switch is standardized by their own domestic standard or the like for affording convenience in use as well as in manufacturing such switches. Further, there is a case where various values are set for the diameter by the domestic standard. For example, two kinds of values, 30 mm and 25 mm, are set in Japan and a value, 22 mm, is set in Europe, as the standarized outer diameter of the cylindrical portion of an industrial-purpose actuating switch. Thus, in a world-wide sense, there are various kinds of standardized values for the outer diameter of the cylindrical portion of the actuating switches. Accordingly, the inner diameter of a hole previously formed in a panel for mounting an actuating switch has to be set with selected one of various kinds of standardized values. For this, on the part of users, it has been necessary to previously form a hole having a standardized diameter properly selected depending on the area of a panel in which the hole is formed and on which an actuating switch is to be mounted or depending on the number or size or the like of equipment to be mounted on the panel, and then selectively procure an actuating switch which is conformity with the prepared hole. On the part of makers, therefore, it has been necessary to previously manufacture and stock various actuating switches having their cylindrical portions which are different from one another in their outer diameter, resulting in increase in expense in view of providing metal patterns on one hand and troubles in view of stock management.

DISCLOSURE OF THE INVENTION

To eliminate such disadvantages as mentioned above, an object of the present invention is provide an adapter for properly mounting an actuating switch having a cylindrical portion the outer diameter of which is smaller than the inner diameter of a hole previously formed in a panel to which the switch is to be mounted.

To attain the above object, according to an aspect of the present invention, an adapter for enabling an actuating switch, which has a contact section and an actuating section movably accommodating therein an actuator for actuating the contact section and which is so arranged that a first hollow cylindrical portion constituting a part of the actuating section and axially movably accommodating therein the actuator can be directly mounted in a first hole having a first predetermined inner diameter and previously formed in a panel, to be mounted through the adapter into a second hole having a second predetermined inner diameter and previously formed in the same or another panel. This adapter comprises first means for engaging with the actuating section and second means for engaging with the panel through the second hole.

BRIEF DESCRIPTION OF THE DRAWINGS

Other objects, features, functions, effects, or the like of the present invention will be apparent from the following descriptions which will be made by referring to accompanying drawings in which:

FIG. 2 is an exploded view of a combination of an embodiment of the adapter according to the invention and an actuating switch which is being mounted onto a panel;

FIG. 9 is an exploded view of a still further combination of an actuating switch and a still further embodiment of the adapter according to the invention;

BEST MODES FOR CARRYING OUT THE INVENTION

Although preferred embodiments of the present invention will be described, the construction of an actuating switch to which the adapter according to the present invention is applied will be described in brief prior to the description of the embodiments.

Figure 1:
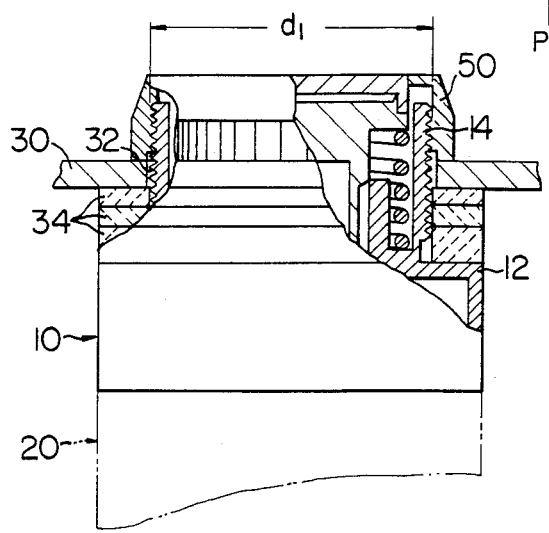
FIG. 1 is a partially sectional elevation illustrating a prior art push button switch, as an example of an actuating switch, which is normally mounted on a panel.

Ordinarily, an actuating switch, such as a push button switch, an illumination type push button switch, a cam switch or the like, has a construction in which a given number of stacked contact sections 20 are coupled with a switch actuating section 10 having a rear box-like portion 12 and a cylindrical portion 14 projecting upward from the box-like portion 12, as shown in FIG. 1. When such an actuating section 10 is mounted onto a panel 30, the cylindrical portion 14 is inserted from the back side of the panel 30 into a mounting hole 32 previously formed in the panel 30 and having an inner diameter which is substantially equal to the outer diameter of the cylindrical portion but a little larger than the latter to enable the latter to loosely pass through the hole, with packing rings 34 disposed between the upper side shoulder portion of the rear box-like portion 12 and the back surface of the panel 30. Then, the top portion of the cylindrical portion 14 is screwed up by a cap 50 from the front side of the panel 30.

Figure 3:
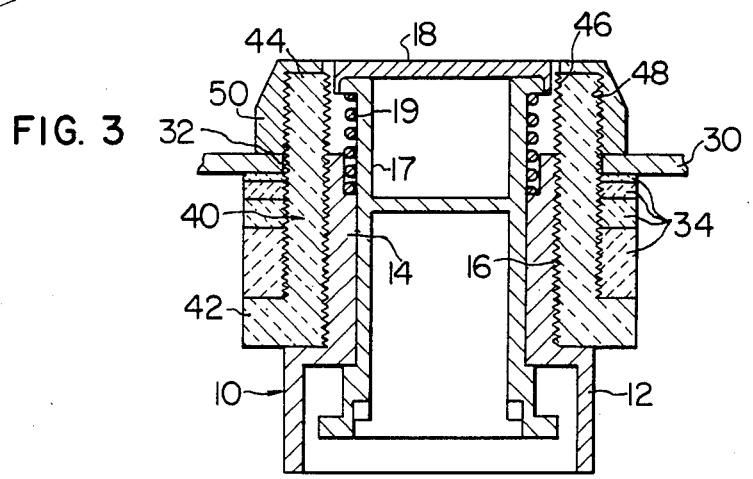
FIG. 3 is an elevation view in section of the combination of FIG. 2 when it has been mounted on a panel.

In FIGS. 2 and 3, an embodiment of an adapter according to the invention for mounting an actuating section of a switch onto a panel is shown in combination with such an actuating switch. The adapter 40 has a flange portion 42 and a cylindrical portion 44 projecting from the flange portion 42 substantially at the central portion of the flange portion 42. In the inner surface of this cylindrical portion 44, an inner thread 46 is provided so that it may engage with an external thread 16 formed in the outer surface of the cylindrical portion 14 of the actuating section 10. Further, in the outer surface of the cylindrical portion 44, an external thread 48 is formed so that it may engage with an inner thread formed in the inner surface of the cap 50. Alternatively, a suitable engaging means such as guiding grooves (not shown) may be formed at the outer surface of the cylindrical portion 44 in place of the external thread 48, if the cap 50 is of an insert engaging type. When the adapter 40 is coupled with the actuating section 10, the external thread 16 of the actuating section 10 is engaged with the inner thread 46 of the adaptor 40. The actuating section 10 with the adapter 40 coupled therewith may be mounted onto the panel 30 in the same manner as that described with respect to FIG. 1 and the detail explanation thereabout is therefore omitted. Further, the numeral 10 designates an actuator for actuating the contact in the contact section 20, 18 designates a push button and 19 designates a spring.

Figure 4:
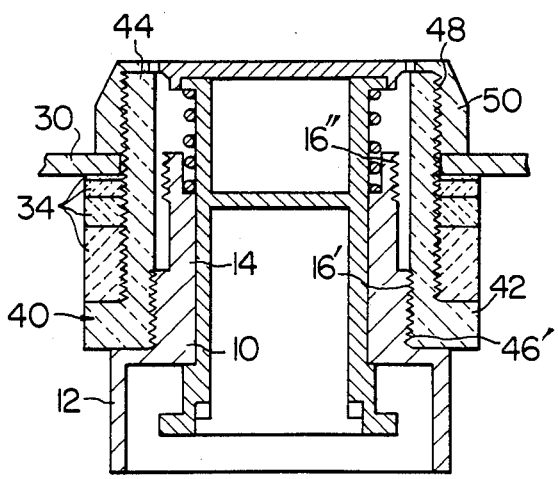
FIG. 4 is an elevation view in section, similarly to FIG. 3, of another combination of an actuating switch and another embodiment of the adapter according to the invention.

FIG. 4 shows another embodiment of the present invention in which the same numerals as those used in FIGS. 1 to 3 designate elements or parts having the same functions and numerals accompanied by a prime designate elements or parts having similar functions. As shown in FIG. 4, an external thread 16' and another external thread 16" which are different from each other in diameter are respectively formed at the top and root portions of the cylindrical portion 14 on one hand, and only an inner thread 46' which may engage with the larger diameter external thread 16' is formed in the inner surface of the adapter 40.

Figure 5:
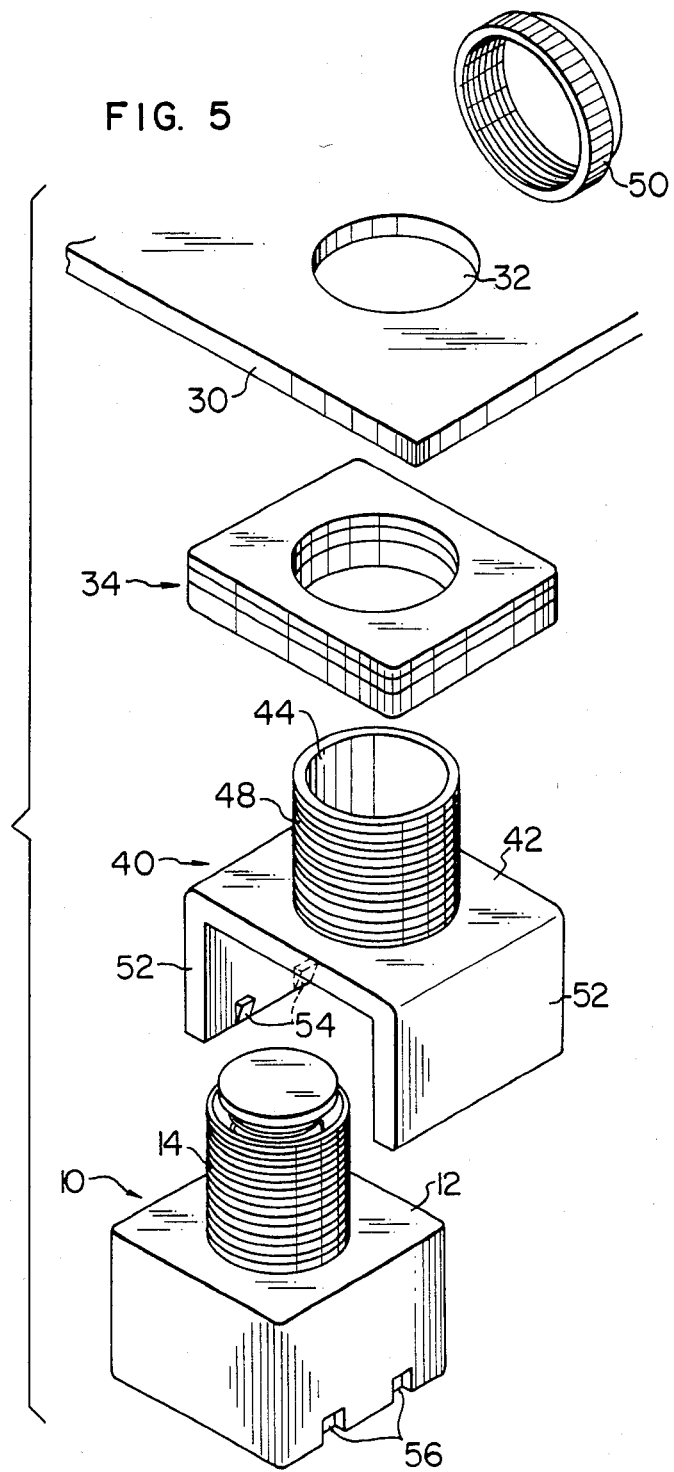
FIG. 5 is an exploded view of a further combination of an actuating switch and a further embodiment of the adapter according to the invention.
Figure 6:
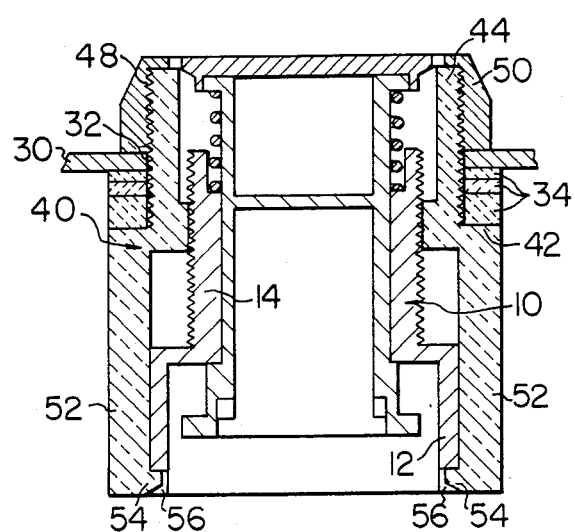
FIG. 6 is an elevation view in section of the combination of FIG. 5 when it has been mounted onto a panel.

FIGS. 5 and 6 show still another embodiment of the present invention, in which the same numerals as those used in FIGS. 1 to 3 designate elements or parts having the same functions and numerals accompanied by a prime designate elements or parts having similar functions.

This embodiment is different from that shown in FIGS. 2 and 3 only in the engagement means between the actuating section 10 and the adapter 40, while it is quite the same as the latter in other points. That is, in the embodiment of FIGS. 2 and 3, the adapter 40 is provided with a rectangular flat flange portion 42 with the cylindrical portion 44 projecting from the upper surface of the flange portion 42, while in this embodiment of FIGS. 2 and 3, an adapter 40 is provided with not only a rectangular flat flange portion 42 with a cylindrical portion 44 projecting from the upper surface of the flange portion 42 but also a pair of opposing legs 52 projecting downward from the lower surface of the flange portion 42 at the opposite ends of the same, respectively. At the lower inner side of each of these legs 52, a projecting hook-like engaging portion 54 is formed. In this case, therefore, no thread is provided in the inner surface of the cylindrical portion 44. In the outer surface of the forward end portion of the cylindrical portion 44, an external thread 48 is provided for engaging with the inner thread of the cap 50. Alternatively, in the case where the cap 50 is of the insert engaging type, guide grooves (not shown) may be formed for insert engagement in place of the external thread 48. When the adapter 40 is coupled with the actuating section 10, the opposing legs 52 of the adapter 40 are outwardly urged to widen the distance therebetween against their elasticity and then, being maintained in this state, they are pushed on along the opposite side walls of the rear box-like portion 12 of the actuating section 10 until their hook-like engaging portions 54 have respectively, resiliently engaged with groove-like recessed engaging portions 56 correspondingly formed on the outer side walls of the box-like portion 12. In this engaged state, the adapter 40 has been elastically fixed on the actuating section 10.

Figure 7:
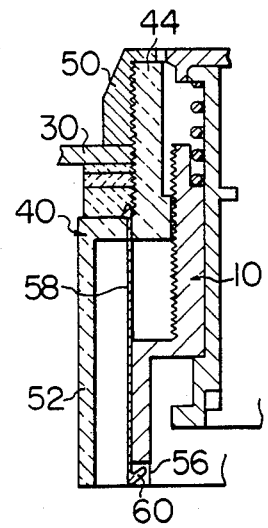
FIG. 7 is a partly sectional elevation of a modification of FIG. 6 combination.

Although the adapter 40 may be entirely made of a resin material, the adapter will be expensive because it is necessary to use a soft resin material in order to provide elasticity. For this, alternatively, a stainless engaging members 58 provided with hook-like engaging portions 60 at their lower ends may be attached to the respective legs 52, as shown in FIG. 7, so that the other portions of the adapter may be made of a relatively inexpensive hard resin material.

Figure 8:
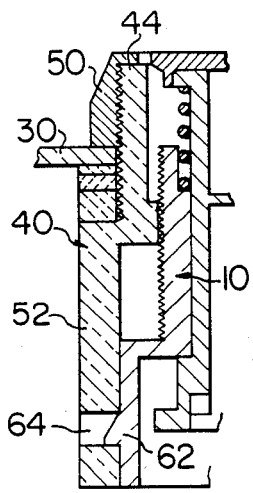
FIG. 8 is a partly sectional elevation of another modification of FIG. 6 combination.

Further alternatively, hook-like protrusions 62 may be formed, as shown in FIG. 8, as the engaging portion of the actuating section 10 in place of the groove-like engaging portions 56, and grooves 64 may be formed on the respective legs 52 of the adapter 40 to engage with these hook-like protrusions 62. The actuating section 10 with the adapter 40 attached thereto may be mounted onto the panel 30 in quite the same manner as that already described and therefore detailed description thereabout will be omitted.

Figure 10:
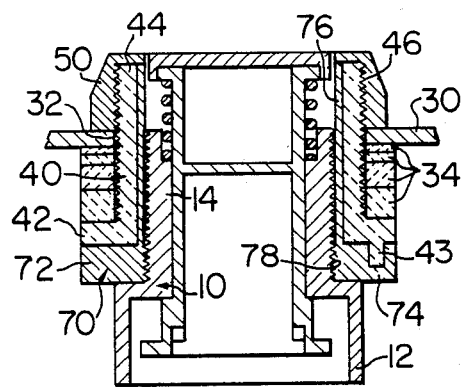
FIG. 10 is an elevation view in section of the combination of FIG. 9 when it has been mounted onto a panel.

FIGS. 9 and 10 show a further embodiment of the present invention, in which the same numerals as those used in FIGS. 1 to 3 designate elements or parts having the same functions.

In the drawings, an adapter 40 may be coupled with an actuating section 10 through an intermediate member 70. This adapter 40 is made of a metal material, such as zinc die-casting or aluminum die-casting, and has a flat flange portion 42 and a cylindrical portion 44 projecting from the upper surface of the flange 42 at its substantially central portion. At the end of this cylindrical portion 44, an external thread 46 is formed for engaging with a cap 50, or alternatively guide grooves (not shown) may be formed if the cap 50 is of an inserted engaging type. Further, at the respective four corner portions on the lower surface of the flange 42, downward projections or protrusions 43 are formed which may engage with recesses 74 correspondingly formed at the four corners on the upper surface of a flange 72 of the intermediate member 70 to secure flanges 42,72 against relative rotation. Those skilled in the art will understand that should the frictional engagement between protrusions 43 and recesses 74 be too low to prevent axial separation of the flanges, means such as suitable adhesive may be used to secure the flanges together. The intermediate member 70 has the flat flange portion 72 and a cylindrical portion 76 projecting from the upper surface of the flange portion 72 at its substantially central portion. The inner diameter of this cylindrical portion 76 is made to be slightly larger than the outer diameter of the cylindrical portion 14 of the actuating section 10 so that the cylindrical portion 76 of the intermediate member 70 may be attached to the actuating section 10 from the outside thereof. Further, the outer diameter of the cylindrical portion 76 is made slightly smaller than the inner diameter of the cylindrical portion 44 of the adapter 40. An inner thread 78 is formed at the lower inner surface of the cylindrical portion 76 so that it may engage with an external thread 16 formed in the outer surface of the cylindrical portion 14 of the actuating section 10. When the thus arranged adapter 40 is attached to the actuating section 10, the intermediate member 70 is first coupled with the actuating section 10 from the outside of the latter by making engagement between the inner thread 78 of the intermediate member 70 and the external thread 16 of the cylindrical portion 14, and thereupon the adapter 40 is made to cover the intermediate member 70 from the outside of the latter so that the protrusions 43 of the adapter 40 are completely inserted in the respective recesses 74 of the flange portion 72 of the intermediate member 70. The actuating section 10 with both the adapter 40 and the intermediate member 70 attached thereto may be mounted in quite the same manner as that already described and therefore the detailed description thereabout will be omitted.

Figure 11:
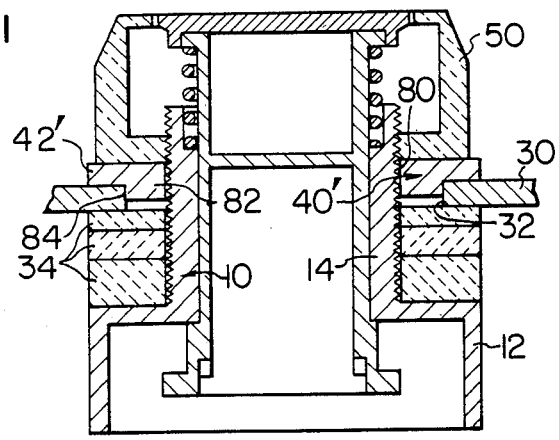
FIG. 11 is an elevation view in section of another combination of an actuating switch and another embodiment of the adapter according to the present invention, when it has been mounted on a panel.
Figure 12:
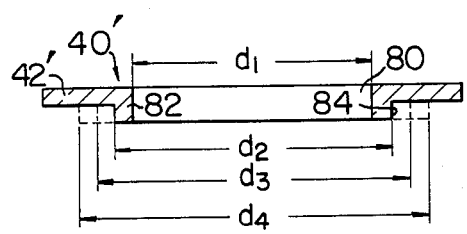
FIG. 12 is an elevation in section of the adapter shown in FIG. 11.
Figure 13:
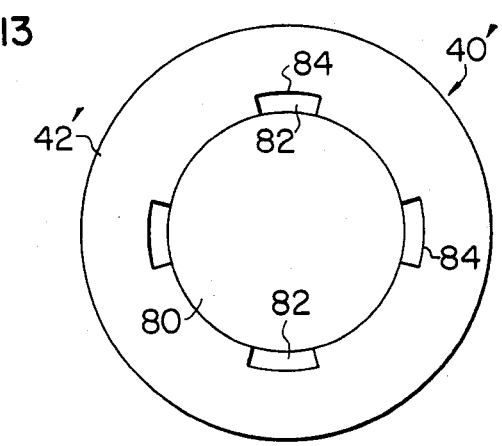
FIG. 13 is a bottom view of the adapter shown in FIG. 11.

FIGS. 11 to 13 show a further embodiment of the present invention, in which the same numerals as those used in FIGS. 1 to 3 designate elements or parts having the same functions and numerals with a prime designate elements or parts having similar functions.

In the drawings, an adapter 40' has a flange portion 42' which is formed at its substantially central portion with a through hole 80 which a cylindrical portion 14 of an actuating section 10 may pass. The flange portion 42' is further formed with a plurality of axially downwardly projecting step portions 82 at the lower surface thereof. According to this embodiment, various adapters are used respectively having various outer diameters such as $d_2$, $d_3$, $d_4$, at the projecting step portions 82, as shown in FIG. 12. These values $d_2$, $d_3$, $d_4$ . . . of the diameter are made to be agreed with the values previously defined by any standard. The projecting step portions 82 may be made to be a single continuous annular step portion (not shown) formed in the circumferential direction along the entire periphery of the through hole 80, or alternatively may includes at least two step portions formed discretely at equal distances as shown in FIG. 13. In mounting an actuating switch, one of the various adapters is selected having an outer diameter at its projecting set portion 82 which may agree with the diameter of a mounting hole 32 formed in a panel 30 to which hole the actuating switch is to be attached. After ring packings 34 have been placed about the cylindrical portion 14 of the actuating section 10, the cylindrical portion 14 is inserted into the mounting hole 32 from the back of the panel 30. Thereupon the adapter 40' is inserted from the front side of the panel 30 with its step portion 82 underside onto the cylindrical portion 14 which has been projected from the front surface of the panel 30. Then the cap 50 is attached to the cylindrical portion 14 from the front side of the adapter 40 so as to fasten the actuating section 10 of the switch. Being fastened, the outer periphery of the step portion 82 of the adapter 40' is made to abut on the inner periphery of the mounting hole 32 and at the same time the lower surface of the flange portion 42' is made to abut on the front surface of the panel 30. In this manner, the adapter 40' is disposed between the actuating section 10 and the panel 30 and fixed to the panel together with the actuating section 10.

Although the thickness of the projecting step portion 82 is preferably selected to be equal or thinner than the thickness of the panel 30, it is not always limited to this and may be selected to be thicker than the thickness of the panel 30. In the latter case, it will do to make the inner diameter of the uppermost ring packing 34 to be larger than the outer diameter of the step portion 82.

We claim:

1. Adapter apparatus for mounting a switch through a hole in a panel, the switch being of the type comprising a contact section and an actuating section, the actuating section comprising a first hollow cylindrical portion within which an actuator is axially movable, the first hollow cylindrical portion being sized to extend through a first hole from one side of a panel into engagement on the other side of a panel with means for securing the switch to the panel, said apparatus being configured for mounting such a switch in a second, larger hole in a panel, said apparatus comprising:

a second hollow cylindrical portion sized to extend through such a second, larger hole;

a third hollow cylindrical portion sized to extend into the interior of said second cylindrical portion;

means on the inside surface of said third cylindrical portion for engaging said first cylindrical portion whereby such a switch is secured to said third cylindrical portion on one side of the panel and the actuator is accessible within said third cylindrical portion from the other side of the panel when said second cylindrical portion is extended through such a second, larger hole in a panel;

means for securing together said second and third cylindrical portions, said means for securing comprising a first radially outwardly extending flange on said third cylindrical portion, said first flange being sized to abut such a switch on one side of said first flange on the one side of such a panel;

a second radially outwardly extending flange on said second cylindrical portion, said second flange being sized to abut the other side of said first flange; and protrusion means on one of said flanges for extending into and engaging with recess means on the other of said flanges;

means for securing such a switch in such a second, larger hole in a panel; and means on the outside surface of said second cylindrical portion for engaging said means for securing on the other side of the panel to mount such a switch in a second, larger hole in a panel.

2. Apparatus according to claim 1, wherein said means for engaging comprises threaded portions on said first, second and third cylindrical portions.

* * * * *